United States Patent
Hori et al.

(10) Patent No.: US 6,263,148 B1
(45) Date of Patent: Jul. 17, 2001

(54) VARIABLE-MODE INFORMATION SIGNAL REPRODUCTION APPARATUS WITH TRACKING CONTROL

(75) Inventors: Taizou Hori, Yokohama; Yasuyuki Tanaka, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/428,651

(22) Filed: Oct. 28, 1999

(30) Foreign Application Priority Data

Nov. 4, 1998 (JP) .................................................. 10-313012

(51) Int. Cl.[7] ....................................................... H04N 5/92
(52) U.S. Cl. ................... 386/46; 386/86; 386/88; 360/77.12; 360/77.15
(58) Field of Search .................................... 386/1, 33, 35, 386/95, 46, 123, 124, 109, 111, 112, 37, 40, 86, 87, 88; 360/22, 27, 32, 77.01, 77.12, 77.13, 77.14, 77.15; H04N 5/76, 5/92, 9/79

(56) References Cited

U.S. PATENT DOCUMENTS

| 5,365,380 | | 11/1994 | Tanaka | 360/10.3 |
|---|---|---|---|---|
| 5,394,275 | * | 2/1995 | Iketani et al. | 386/35 |
| 5,465,180 | * | 11/1995 | Amada et al. | 386/35 |
| 5,499,145 | * | 3/1996 | Azuma et al. | 386/35 |
| 5,550,640 | * | 8/1996 | Tsuboi et al. | 386/33 |
| 5,642,457 | * | 6/1997 | Higurashi | 386/35 |
| 5,966,496 | * | 10/1999 | Takimoto | 386/95 |
| 5,991,504 | * | 11/1999 | Hori | 386/112 |
| 6,026,212 | * | 2/2000 | Oguro | 386/67 |
| 6,104,862 | * | 8/2000 | Amada et al. | 386/35 |

* cited by examiner

*Primary Examiner*—Thai Tran
(74) *Attorney, Agent, or Firm*—Fitzpatrick, Cella, Harper & Scinto

(57) ABSTRACT

A reproduction apparatus reproduces information signals recorded in a plurality of recording modes having different information sizes of an information signal to be recorded per unit time, discriminates the recording mode of the reproduced information signal, and controls tracking between a recording medium and head in accordance with the discrimination result.

26 Claims, 8 Drawing Sheets

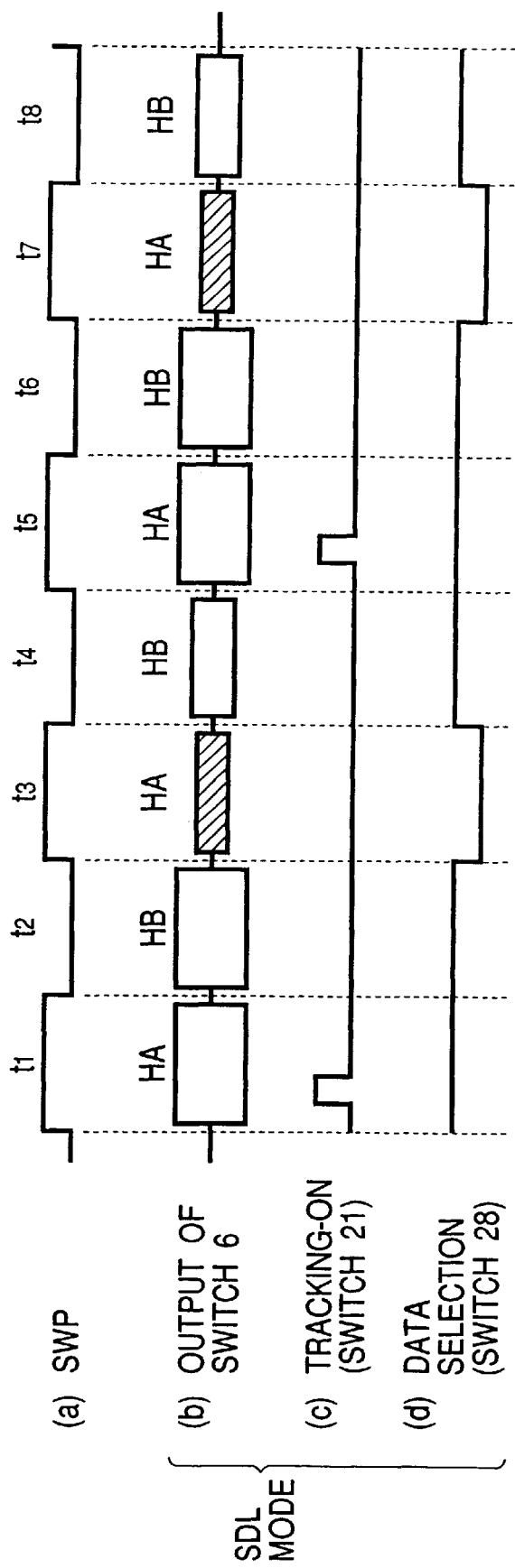

VARIABLE-MODE INFORMATION SIGNAL REPRODUCTION APPARATUS WITH TRACKING CONTROL

BACKGROUND OF THE INVENTION

1. Field of the Invention

The present invention relates to an information signal reproduction apparatus and, more particularly, to tracking control upon reproduction.

2. Related Background Art

As a conventional apparatus of this type, a digital VTR is known. In this apparatus, an image signal is converted into a digital signal, the digital signal is encoded to compress its information size, and the encoded digital signal is recorded on a magnetic tape while forming a large number of tracks. Upon reproduction, these tracks are traced by a rotary head to reproduce the recorded image signal, and the reproduced image signal is decoded to expand its information size, thus obtaining an original image. For a digital VTR of this type, in recent years, home-use digital VTR standards called DV format has been proposed.

Of this DV format, in an SD mode, an image signal is converted into a digital signal, its information size is compressed to around 1/5 by a technique such a the DCT, variable-length coding, or the like, and an image signal for one frame is recorded on 10 helical tracks in case of NTSC.

By contrast, in order to record an image signal on a magnetic tape for a longer period of time, a recording mode called an SDL mode has also been proposed. In this mode, a higher compression ratio than the SD mode is set to compress the information size of an image signal to 1/2, and an image signal for one frame is recorded on five tracks.

As the arrangement of a head for recording/reproducing an image signal in both the SD and SDL modes, the arrangement shown in FIG. 1 may be used.

More specifically, referring to FIG. 1, a magnetic tape T serves as a recording medium, and a rotary drum 101 rotates in contact with the magnetic tape. In FIG. 1, the tape T is wound around the rotary drum 101 over a 180° range or larger. A rotary head (HA1) 102 is attached onto the drum 101. A rotary head (HB1) 103 is attached onto the drum 101 to have a 180° phase difference from the head (HA1) 102. A head (HB2) 104 for the SDL mode is attached in the neighborhood of the head (HA1) 102.

The heads 103 and 104 have the same azimuth angle, and the head 102 has an azimuth angle different from those of the heads 103 and 104.

FIG. 2 shows tracks formed on the magnetic tape T by the heads shown in FIG. 1 in the respective modes.

In the SD mode, the tape T travels at a predetermined speed S in the direction of an arrow A, and a recording current is alternately supplied to the head (HA1) 102 and head (HB1) 103 that trace in the direction of an arrow H, thereby forming tracks at a rate of two tracks per rotation of the rotary drum 101.

Referring to FIG. 2, HA1, HB1, and HB2 indicate the heads that formed tracks, and F0, F1, and F2 the states of tracking signals superposed on the recorded signals on the individual tracks.

In the DV format (SD and SDL modes), an image signal undergoes 24/25 modulation upon recording to superpose a pilot signal used in tracking control upon reproduction on the recorded signal on each track. FIG. 3 shows the frequency components of recorded signals on tracks F0, F1, and F2, and tracks are formed in the order of F0→F1→F0→F2→F0. As shown in FIG. 3, on track F1, a frequency component f1 has a peak, and a frequency component f2 and DC component are suppressed. On track F2, a frequency component f2 has a peak, and a frequency component f1 and DC component are suppressed. On track F0, frequency components f1 and f2, and the DC component are suppressed.

In the SD mode, an image is recorded by forming 10 tracks per frame on the tape T.

On the other hand, in the SDL mode, although the rotational speed of the drum 101 is the same as that in the SD mode, the convey speed of the tape T is set at S/2, i.e., half that in the SD mode, and a recording current is alternately supplied to the head (HA1) 102 and head (HB2) 104, thus forming tracks at a rate of one track per rotation of the rotary drum 101. At this time, since the track pitch is nearly the same as that in the SD mode, and the convey speed of the tape is half that in the SD mode, the track angle becomes slightly different from that in the SD mode.

In the SDL mode, an image signal is recorded by forming five tracks per frame. For this reason, the SDL mode can realize a recording time twice that in the SD mode.

When an image signal is reproduced from the tape T shown in FIG. 2, an image signal recorded in the SD mode is reproduced by the head (HA1) 102 and head (HB1) 103, and an image signal recorded in the SDL mode is reproduced by the head (HA1) 102 and head (HB2) 104. In this case, an image signal is reproduced while controlling tracking between the heads and tracks on the basis of pilot signals superposed upon recording.

As described above, upon reproducing the contents of a tape on which an image signal is recorded in only the SD mode, the head (HA1) 102 and head (HB1) 103 shown in FIG. 1 need only be used; upon reproducing the contents of a tape on which an image signal is recorded in only the SDL mode, the head (HA1) 102 and head (HB2) 104 shown in FIG. 2 need only be used.

However, upon reproducing the contents of a tape on which image signals are recorded in both the SD and SDL modes, as shown in FIG. 2, the three heads shown in FIG. 1 are required, and the number of heads required increases compared to reproduction of a tape on which an image signal is recorded in only the SD or SDL mode.

For this reason, such arrangement leads to an increase in cost due to requirements of extra head, rotary transformer, head amplifier, and the like.

SUMMARY OF THE INVENTION

It is an object of the present invention to solve the aforementioned problems.

It is another object of the present invention to allow reproduction of a signal from a recording medium on which information signals are recorded in a plurality of different modes, without increasing the number of heads.

In order to achieve these objects, according to one aspect of the present invention, there is provided an apparatus for reproducing information signals recorded in a plurality of recording modes having different information sizes of an information signal to be recorded per unit time, comprising:

reproduction means for reproducing information signals recorded in the plurality of modes from a recording medium;

mode discrimination means for discriminating a recording mode of the information signal reproduced by the reproduction means;

tracking means for controlling tracking between the recording medium and the reproduction means; and control means for controlling tracking by the tracking means in accordance with a discrimination result of the mode discrimination means.

It is still another object of the present invention to implement satisfactory tracking control upon reproducing signals from a recording medium on which information signals are recorded in a plurality of different modes.

Other objects and features of the present invention will become apparent from the following detailed description of the embodiments taken in conjunction with the accompanying drawings.

BRIEF DESCRIPTION OF THE DRAWINGS

FIG. 9 is a timing chart for explaining the reproduction process by the VTR shown in FIG. 8.

DETAILED DESCRIPTION OF THE PREFERRED EMBODIMENTS

The preferred embodiments of the present invention will be described in detail hereinafter with reference to the accompanying drawings.

Figure 4:
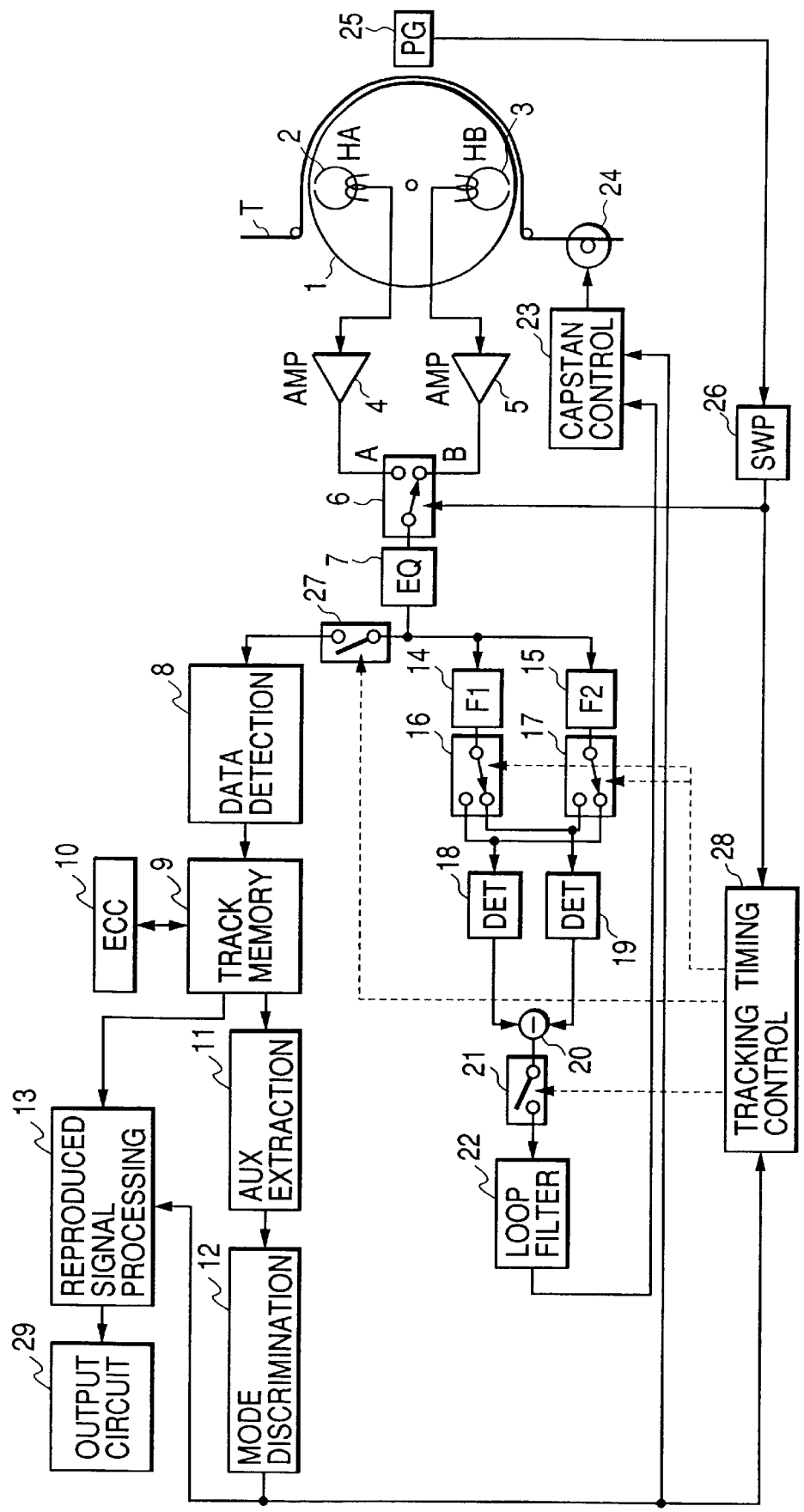
FIG. 4 is a block diagram showing the arrangement of a digital VTR according to an embodiment of the present invention.

FIG. 4 is a block diagram showing the arrangement of a digital VTR according to the first embodiment of the present invention.

Figure 2:
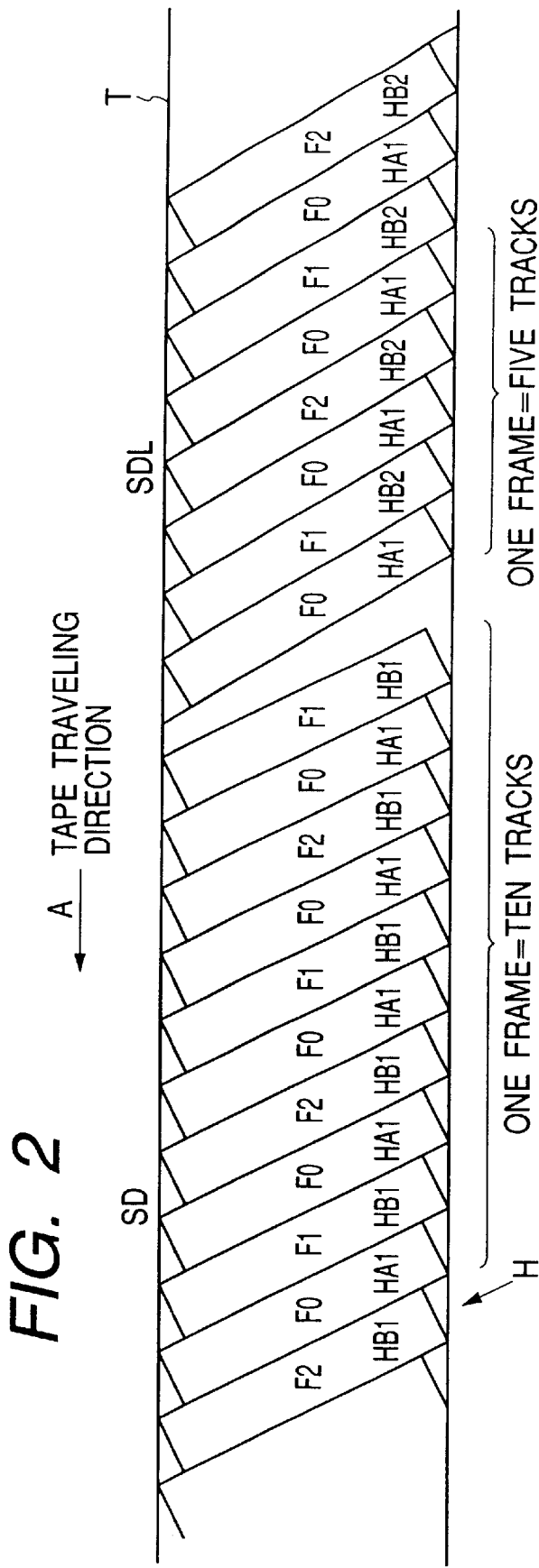
FIG. 2 shows tracks formed in the SD and SDL modes.

Referring to FIG. 4, a magnetic tape T is formed with tracks, as shown in FIG. 2, and an image signal is recorded on that tape T in the SD or SDL mode.

A head (HA) 2 is attached to a rotary drum 1, and a head (HB) 3 is attached to the rotary drum 1 to have a 180° phase difference from the head (HA) 2. Note that the head (HA) 2 has the same azimuth angle as that of the head (HA1) 102 shown in FIG. 1, and the head (HB) 3 has the same azimuth angle as that of the head (HB1) 103 or head (HB2) 104 shown in FIG. 1. The tape T is wound around the rotary drum 1 over a 180° range or larger.

Amplifiers 4 and 5 respectively amplify reproduced signals output from the heads 2 and 3. A switch 6 selects one of the output signals from the amplifiers 4 and 5, and outputs the selected signal to an equalizer 7. The equalizer 7 compensates for deterioration of a reproduced signal upon magnetic recording/reproduction.

A data detection circuit 8 detects an original digital signal from the reproduced signal. A track memory 9 stores a compressed reproduced image signal for three frames intact. An error correction circuit 10 corrects any errors in the reproduced signal stored in the track memory 9. An AUX extraction circuit 11 extracts auxiliary data (VAUX data) appended to the image signal stored in the track memory 9. A mode discrimination circuit 12 discriminates the recording mode (SD or SDL mode) of the reproduced image signal on the basis of the VAUX data output from the AUX extraction circuit 11. A reproduced signal processing circuit 13 decodes the image signal output from the track memory 9 in correspondence with encoding upon recording, to expand the information size of the image signal.

Figure 3:
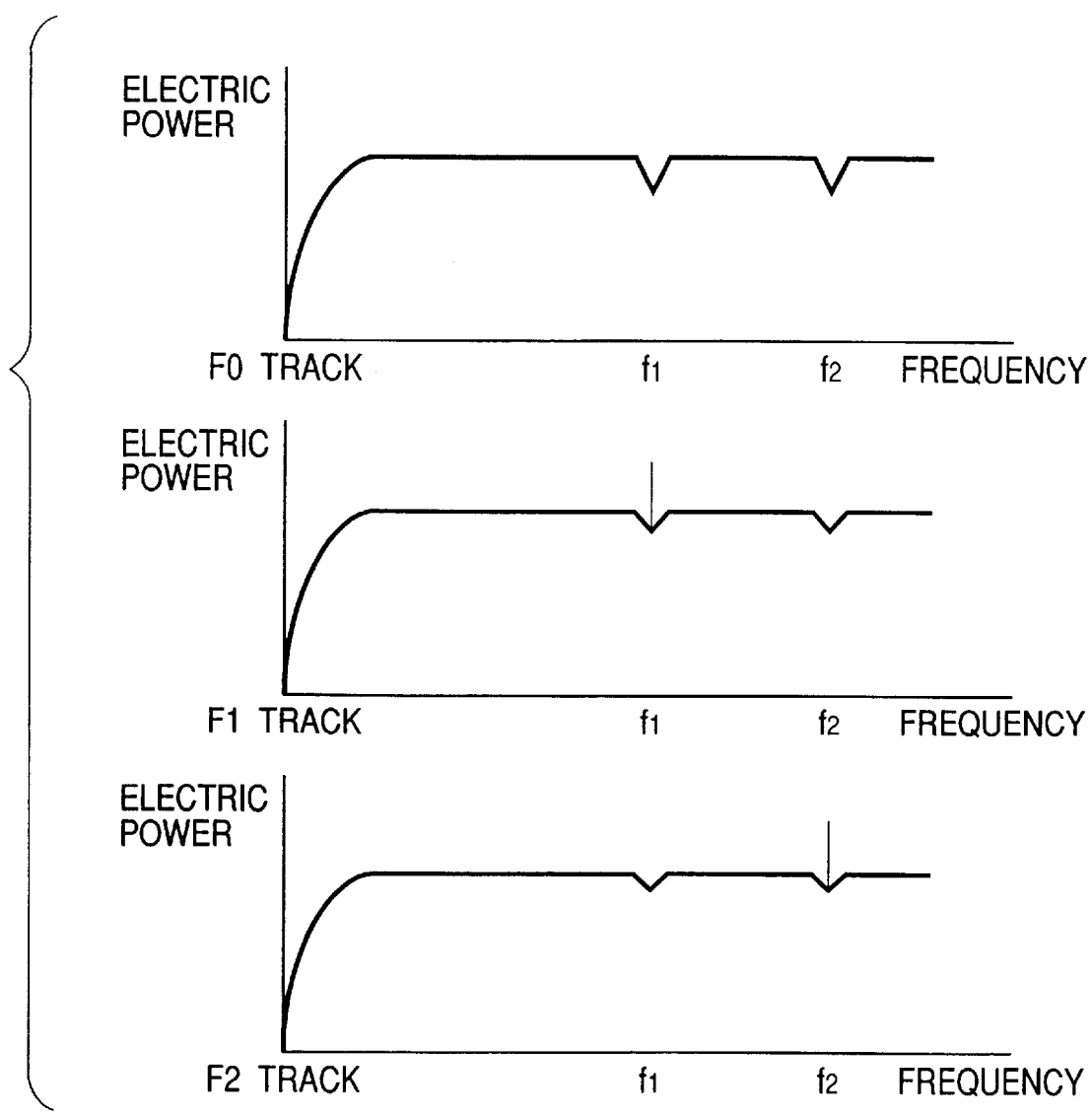
FIG. 3 is a graph showing the frequency components on the individual tracks.

Filters 14 and 15 respectively extract components f1 and f2 of a pilot signal shown in FIG. 3 from the reproduced signal output from the equalizer 7. Switches 16 and 17 respectively select and output one of signals of the frequency components f1 and f2 obtained by the filters 14 and 15. Detecting circuits 18 and 19 respectively detect the levels of pilot signals output from the switches 16 and 17. A subtraction circuit 20 calculates the difference between the outputs from the detecting circuits 18 and 19. A switch 21 outputs an output from the subtraction circuit 20 to a loop filter 22 in accordance with a control signal from a tracking timing control circuit 28. The loop filter 22 filters the output from the subtraction circuit 20 obtained via the switch 21 to generate a tracking error signal (ATF error signal), and outputs that signal to a capstan control circuit 23.

The capstan control circuit 23 controls a capstan motor 24 in accordance with the tracking error signal from the loop filter 22 and recording mode information from the mode discrimination circuit 12. The capstan motor 24 controls driving of a capstan to convey the tape T in accordance with the control signal from the capstan control circuit 23. A PG generation circuit 25 generates a PG signal indicating the rotation phase of the drum 2 in correspondence with rotation of the rotary drum 2. A switch pulse generation circuit 26 generates a head switch pulse serving as a switching signal for the switch 7 so as to select one of the reproduced signals from the head (HA) 2 and head (HB) 3 in accordance with the PG signal from the PG generation circuit 25. A switch 27 outputs the output signal from the equalizer 7 to the data detection circuit 8. The tracking timing control circuit 28 controls the switches 16 and 17, and the switches 21 and 27, in accordance with recording mode information from the mode discrimination circuit 12 and the head switch pulse from the switch pulse generation circuit 26.

The reproduction process of a signal by the apparatus shown in FIG. 4 will be explained below.

Upon receiving a reproduction start instruction from a console (not shown), the capstan control circuit 23 controls the capstan motor 24 to convey the tape T at a predetermined speed, and the rotary drum 1 is rotated at a predetermined speed by a drum motor (not shown). The heads 2 and 3 alternately trace the tape T to reproduce a signal recorded on the tape T, and output the reproduced signal to the equalizer 7 via the amplifiers 4 and 5 and switch 6.

The switch 6 is switched between terminals A and B in accordance with the head switch pulse from the switch pulse generation circuit 26, and outputs one of the reproduced signals from the amplifiers 4 and 5 to the equalizer 7. The equalizer 7 compensates for deterioration of the reproduced signal due to magnetic recording/reproduction, shapes its signal waveform, and outputs the processed signal to the data detection circuit 8 via the switch 27 and also to the filters 14 and 15.

The data detection circuit 8 detects original digital data from the reproduced signal using a detection method such as integral detection, Viterbi decoding, or the like, and outputs the detected digital data to the track memory 9. The track memory 9 has a capacity capable of storing the compressed signal for three frames output from the data detection circuit. The error correction circuit 10 corrects any errors in the reproduced image signal stored in the track memory 9 using parity data appended upon recording, and writes corrected data in the track memory 9 again. Note that the operation of the switch 27 will be explained later.

The AUX extraction circuit 11 detects VAUX data appended to the image signal from the reproduced signal stored in the track memory 9, and outputs the detected data to the mode discrimination circuit 12. The mode discrimination circuit 12 detects mode identification data indicating a recording mode from the VAUX data output from the AUX extraction circuit 11, discriminates the recording mode of the reproduced image signal on the basis of the mode identification data, and outputs recording mode information to the reproduced signal processing circuit 13, capstan control circuit 23, and tracking timing control circuit 28.

The reproduced image signal that has undergone the error correction process is output to the reproduced signal processing circuit 13. The reproduced signal processing circuit 13 decodes the reproduced image signal in correspondence with encoding upon recording in accordance with the recording mode information from the mode discrimination circuit 12, and outputs the decoded signal to an output circuit 29. The output circuit 29 converts the reproduced image signal into a format suitable for an external device, and outputs the converted signal.

The operation upon tracking control in the apparatus shown in FIG. 4 will be explained below.

The reproduced signal output from the equalizer 7 is output to the filters 14 and 15. The filters 14 and 15 respectively extract pilot signals of frequencies f1 and f2 shown in FIG. 3 from the reproduced signal, and output the extracted signals to the detecting circuits 18 and 19 via the switches 16 and 17. The detecting circuits 18 and 19 detect the levels of the pilot signals output from the switches 16 and 17, and output the detected levels to the subtraction circuit 20. The subtraction circuit 20 calculates the difference between the output levels from these detecting circuits 18 and 19 (in this embodiment, the output from the detecting circuit 19 is subtracted from that from the detecting circuit 18, but it may be vice versa), and outputs the difference to the loop filter 22 via the switch 21.

The loop filter 22 determines the loop gain of the tracking control loop consisting of the heads 2 and 3, amplifiers 4 and 5, equalizer 7, filters 14 and 15, detecting circuits 18 and 19, subtraction circuit 20, loop filter 22, capstan control circuit 23, and capstan motor 24. The loop filter 22 filters the output from the switch 21, and outputs the filtered signal to the capstan control circuit 23.

In this embodiment, each of the heads 2 and 3 has a width slightly larger than that of each track formed on the tape. For example, when the head traces track F0, pilot signals of frequencies f1 and f2 leak from two neighboring tracks having different azimuth angles, i.e., tracks F1 and F2, into the reproduced signal from track F0.

The capstan control circuit 23 outputs a control signal to the capstan motor 24 so that pilot signals of frequencies f1 and f2, which are contained in the reproduced signal from track F0 upon tracing track F0 and are detected by the filters 14 and 15, have the same level, i.e., the head 2 normally scans track F0, thus controlling travel of the tape T.

More specifically, tracking control is done so that the loop filter 22 outputs zero level.

As can also be seen from FIG. 2, in this embodiment, tracks are formed on the tape T in the order of F0→F1→F0→F2→F0. For this reason, the positions of tracks F1 and F2 that neighbor track F0 are reversed in units of tracks. Hence, when the outputs from the filters 14 and 15 are detected and the detected signals are directly output to the subtraction circuit 20, the sign of the output from the subtraction circuit 20 is inverted in units of tracks, and the direction (phase) of tracking control is reversed between the lead and lag directions.

For this reason, the tracking timing control circuit 28 controls the switches 16 and 17 to alternately select the outputs from the filters 14 and 15 every other tracks, and output them to the detecting circuits 18 and 19, thereby preventing the sign of the output from the subtraction circuit 20 from being inverted.

As described above, the pilot signals of frequencies f1 and f2 are simultaneously obtained only when track F0 is traced. When track F1 or F2 is traced, only a pilot signal of frequency f1 or f2 is obtained.

In this embodiment, the tracking timing control circuit 28 controls the switch 21 to output the output from the subtraction circuit 20 to the loop filter 22 only when the head 2 traces track F0. The control process of the switch 21 varies depending on whether the recording mode of the reproduced is the SD or SDL mode, and will be described later.

The tracking timing control circuit 28 controls the switches 16 and 17 on the basis of the head switch pulse from the switch pulse generation circuit 26, and also controls the switches 21 and 27 on the basis of the recording mode information from the mode discrimination circuit 12 and the head switch pulse.

The tracking control process when the recording mode of the reproduced signal is the SD mode and that when it is the SDL mode will be explained below.

Figure 5:
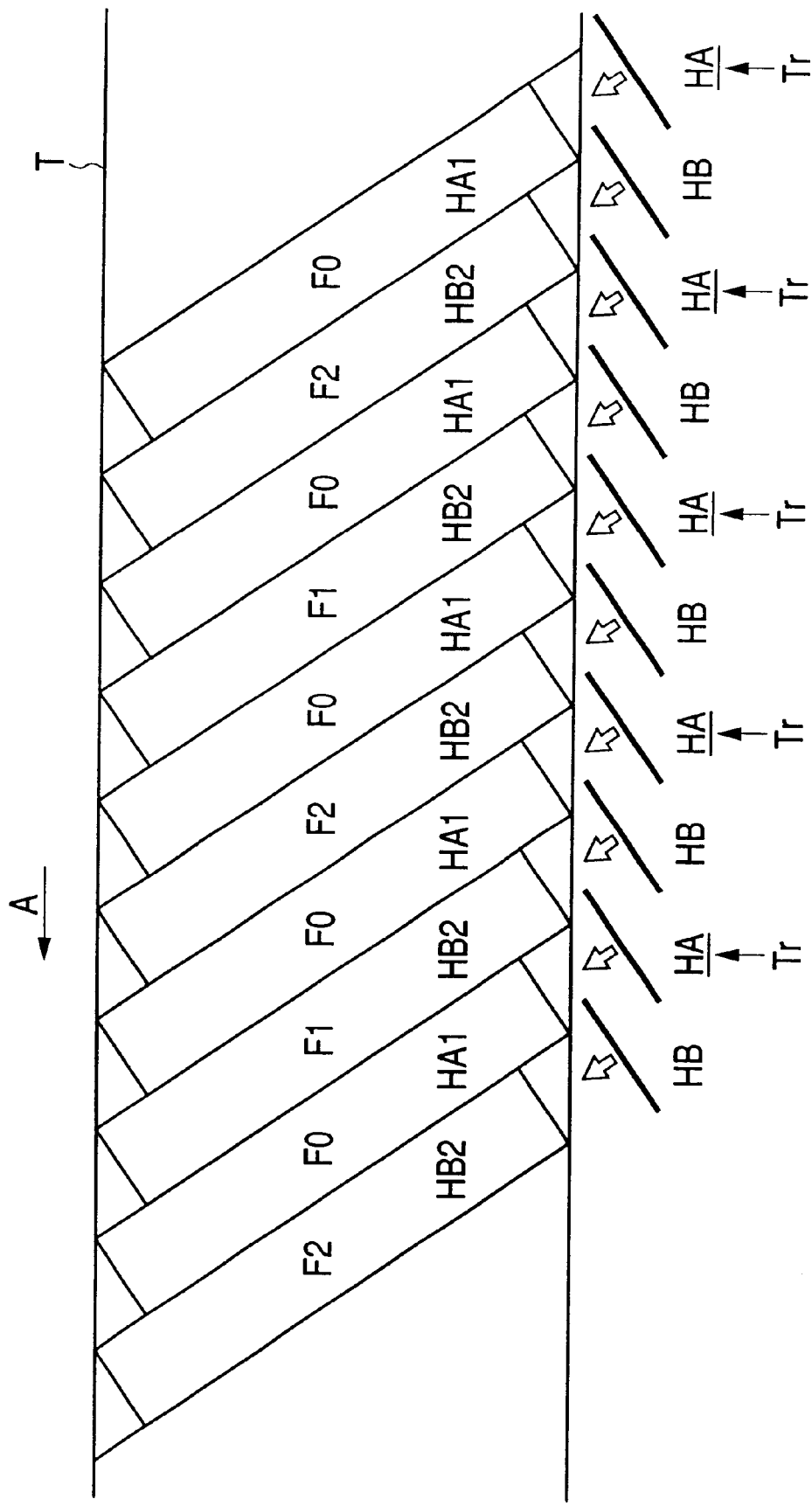
FIG. 5 is a view for explaining the reproduction process of an image signal in the SD mode by the VTR shown in FIG. 4.

FIG. 5 illustrates the state wherein tracks formed in the SD mode shown in FIG. 3 are traced by the heads 2 and 3 shown in FIG. 4.

When the mode discrimination circuit 12 detects a mode signal indicating the SD mode from the VAUX data, the capstan control circuit 23 controls the capstan motor 24 to convey the tape T at a predetermined speed S.

When the recording mode is the SD mode and tracking is normal, the inrush positions of the heads are as indicated by HA and HB in FIG. 5, and the heads 2 and 3 can normally trace the individual tracks, as shown in FIG. 5.

For this reason, a signal having a sufficient level is reproduced from each track in units of traces. Hence, the tracking timing control circuit 28 turns on the switch 21 at a timing indicated by Tr in FIG. 5, i.e., the timing at which the head 2 is tracing track F0, in the SD mode, thus outputting the output from the subtraction circuit 20 to the loop filter. In the SD mode, the circuit 28 keeps the switch 27 ON.

Figure 6:
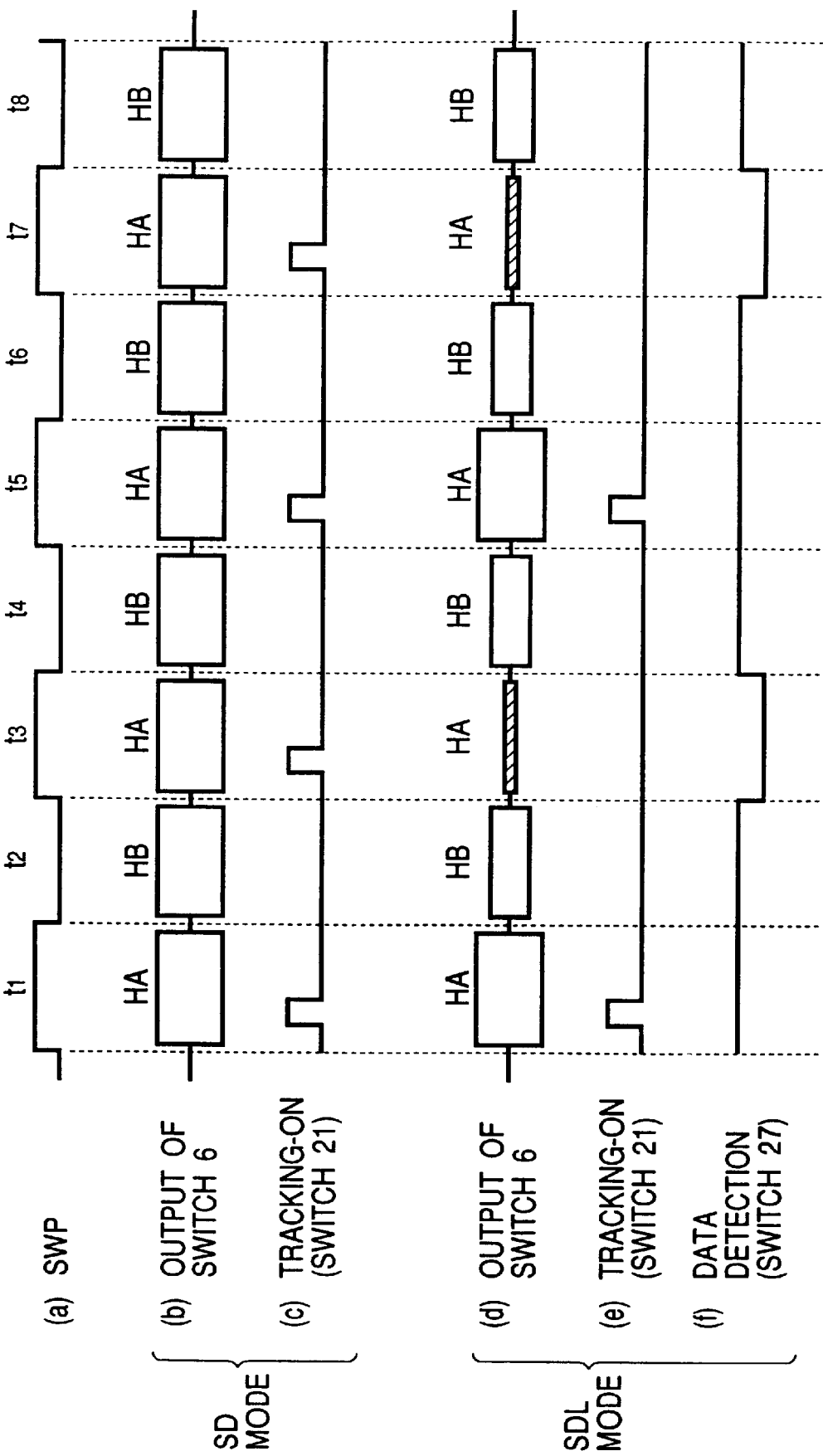
FIG. 6 is a timing chart for explaining reproduction by the VTR shown in FIG. 4.

FIG. 6 is a timing chart of the respective units in the SD mode.

Referring to FIG. 6, a waveform (a) indicates a head switch pulse signal from the switch pulse generation circuit 26. The tracking timing control circuit 28 turns on the switch 21 at the timing at which the head (HA) 2 is tracing the tape T in synchronism with the switch pulse, as indicated by a waveform (c). In the SD mode, a reproduced signal with a sufficient level can be obtained in units of traces of each head, as indicated by a waveform (b).

The control process in the SDL mode will be explained below.

Figure 7:
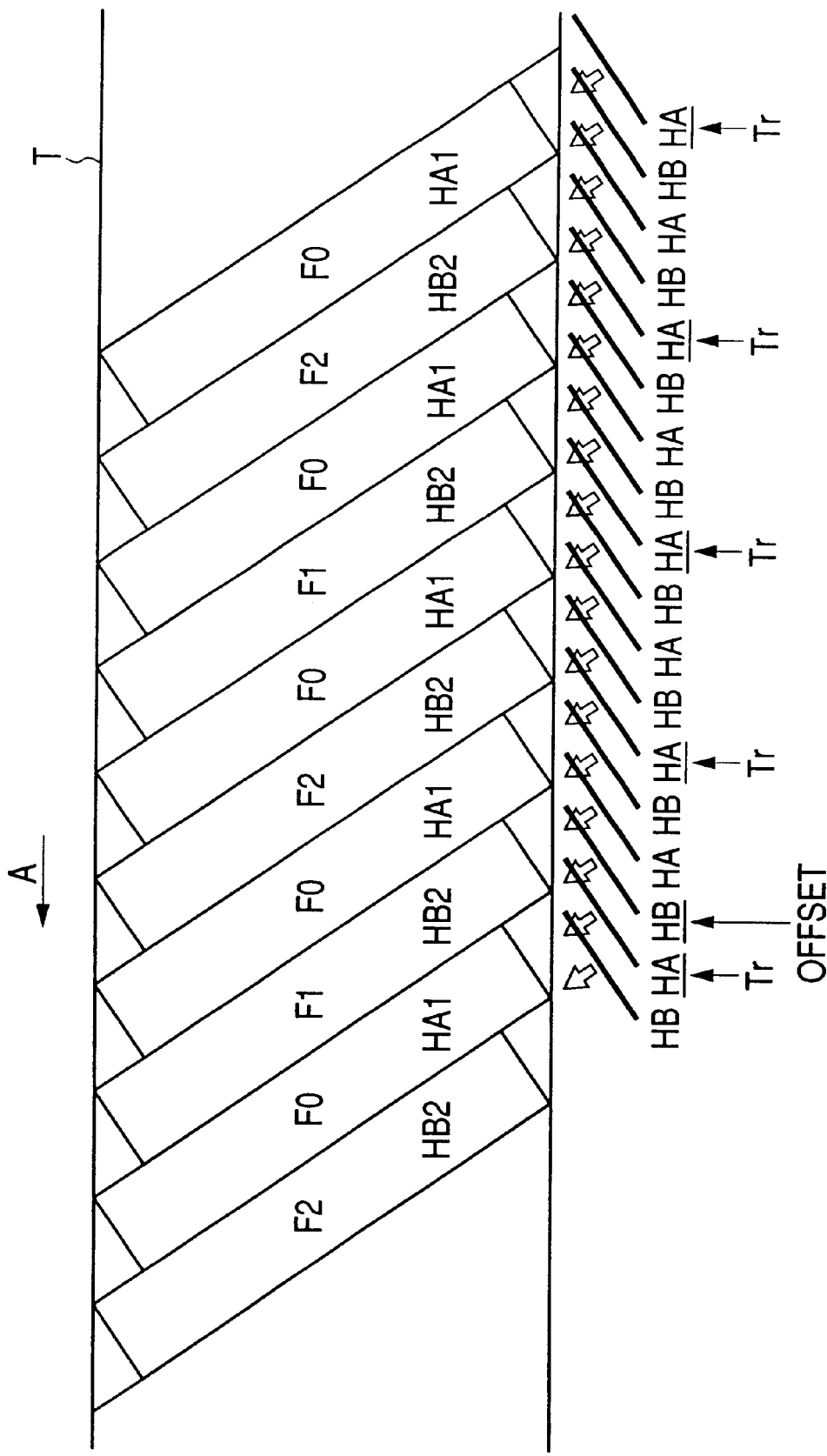
FIG. 7 is a view for explaining the reproduction process of an image signal in the SDL mode by the VTR shown in FIG. 4.

FIG. 7 shows the state wherein tracks formed in the SDL mode shown in FIG. 3 are traced by the heads 2 and 3 shown in FIG. 4.

When the mode discrimination circuit 12 detects a mode signal indicating the SDL mode from the VAUX data, the capstan control circuit 23 controls the capstan motor 24 to convey the tape T at a predetermined convey speed S/2.

When a signal recorded in the SDL mode is reproduced, the rotational speed of the drum 1 in FIG. 4 is the same as that in the SD mode, but the convey speed of the tape T is ½ that in the SD mode. For this reason, the inrush positions of the heads 2 and 3 with respect to the tracks are as shown in FIG. 7.

Since tracks HA1 and HB2 have different azimuth angles, a signal on track HB2 cannot be reproduced by the head (HA) 2, and a signal on track HA1 cannot be reproduced by the head (HB) 3. Hence, the level of the reproduced signal from the switch 6 is as indicated by a waveform (d) in FIG. 6, and a reproduced signal having a sufficient level can be obtained from the head 2 once (period t1 or t5) per two traces, i.e., two rotations of the drum 1.

Also, as can be seen from FIG. 7, track HB2 is track F1 or F2, and no pilot signals can be obtained from the two neighboring tracks.

When the switch 21 is turned on for each trace of the head 2 as in the SD mode, a reproduced signal with a sufficient level cannot be obtained during periods t3 and t7 in which the head 2 is tracing track HB2, and no pilot signal components can be obtained from the two neighboring tracks. For this reason, when the output from the subtraction circuit 20 is supplied to the loop filter 22 during these periods t3 and t7, wrong tracking control may be made.

In this embodiment, the tracking timing control circuit 28 turns on the switch 21 at a timing indicated by Tr in FIG. 7, i.e., once per two traces of the head 2, only a satisfactory tracking error signal is supplied to the loop filter 22. In the SDL mode, the tracking timing control circuit 28 turns on the switch 21 once per two periods of the head switch pulse on the basis of the head switch pulse, as indicated by a waveform (e) in FIG. 6.

As described above, in this embodiment, when the tracking timing control circuit 28 turns on the switch 21 once per two traces of the head 2, a tracking error signal having a sufficient level can be obtained, and tracking control can be made to make the head 2 normally trace track F0. Since the track angle is slightly different from that in the SD mode but the track pitch is nearly the same as that in the SD mode, a signal having a sufficient level can be reproduced by the head 2 from roughly the entire area of track F0, as indicated by the waveform (d) in FIG. 6.

The hatched portions in the waveform (d) in FIG. 6 correspond to periods in which the head 2 is tracking track HB2. During these periods, since track HB2 and the head 2 have different azimuth angles, no signal with a sufficient level can be obtained from the head 2. For this reason, the tracking timing control circuit 28 turns off the switch 27 during the hatched periods in the waveform (d) in FIG. 6, i.e., periods in which the head 2 is tracing track HB2, on the basis of the head switch pulse, thus inhibiting the reproduced signal from the head 2 from being output to the track memory 9.

The reproduced signal from the head 3 has a level which is high enough to make the data detection circuit 8 detect original digital data, although the level is slightly smaller than that in the SD mode indicated by the waveform (b) in FIG. 6, as indicated by the waveform (d) in FIG. 6.

In this manner, in this embodiment, since the tracking error signal extraction timing is changed in correspondence with the SD and SDL modes, a signal recorded in the SDL mode can be reproduced using only the heads 2 and 3 corresponding to the SD mode.

Figure 1:
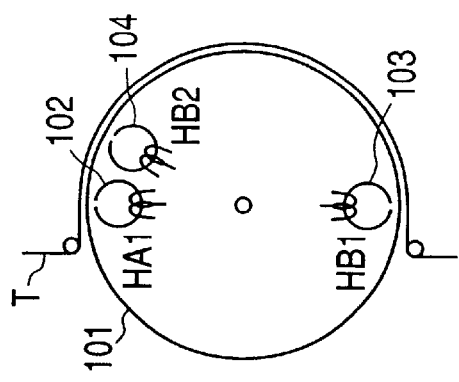
FIG. 1 is a view showing the arrangement of heads upon recording/reproducing an image signal in the SD and SDL modes.

For this reason, signals recorded in the SD and SDL modes can be reproduced without adding any dedicated SDL head shown in FIG. 1, and an increase in cost of the apparatus can be suppressed.

The second embodiment of the present invention will be described below.

In the above embodiment, since each head has a width slightly larger than the track width, and tracking control is made to obtain a reproduced signal with a sufficient level from the head 2 over nearly the entire area of the track upon reproduction in the SDL mode, the head 3 traces across two tracks, i.e., tracks HA1 and HB2.

For this reason, the reproduced signal from the head 3 has a level lower than that from the head 2. Although the data detection circuit 8 can detect original digital data from the reproduced signal from the head 3, the number of errors in the reproduced signal from the head 3 may become larger than that in the reproduced signal from the head 2.

To solve this problem, in this embodiment, a tracking error signal is offset so that the head 3 traces either track F1 or F2.

Figure 8:
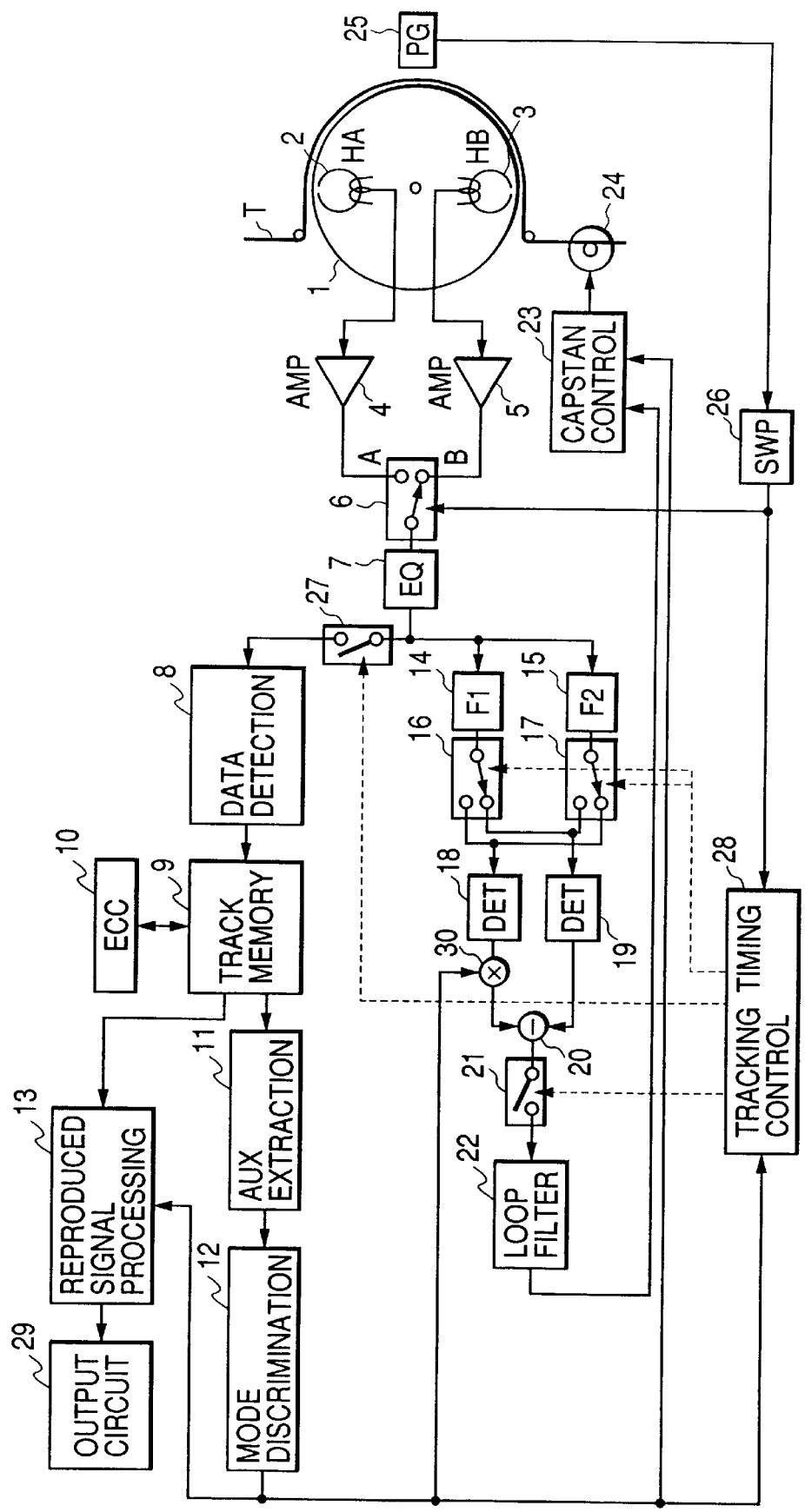
FIG. 8 is a block diagram showing the arrangement of a digital VTR according to another embodiment of the present invention.

FIG. 8 is a block diagram showing the arrangement of a digital VTR in this embodiment, and a description of the same arrangement as that in FIG. 4 will be omitted.

Referring to FIG. 8, a multiplication circuit 30 multiplies the output from the detecting circuit 18 in accordance with recording mode information from the mode discrimination circuit 12.

That is, when the recording mode is the SD mode, the output from the detecting circuit 18 is directly output to the subtraction circuit 20. On the other hand, when the recording mode is the SDL mode, the output from the detecting circuit 18 is multiplied by a predetermined coefficient to control the balance between the levels of the pilot signals from the filters 14 and 15, thereby offsetting a tracking error signal so that the head 3 traces track HB2.

More specifically, an offset for delaying the phase of a tracking error signal is given so that the head (HB) 3 traces track F1 at, e.g., a timing indicated by "OFFSET" in FIG. 7.

FIG. 9 is a timing chart in the SDL mode when such offset is given.

As can be seen from a waveform (b) in FIG. 9, the reproduced signal levels during periods t2 and t6 become higher than those in the first embodiment indicated by the waveform (d) in FIG. 6. Hence, errors in signals reproduced during these periods can be fewer than those in the first embodiment.

On the other hand, the reproduced signal levels during periods t4 and t8 in the waveform (b) in FIG. are lower than those in the waveform (d) in FIG. 6, since the tracking error signal is shifted to make the head 3 trace track HB2 during the periods t2 and t6. However, the reproduced signal obtained during the period t4 is a signal reproduced from the same track as that obtained during the period t2, and the reproduced signal obtained during the period t8 is a signal reproduced from the same track as that obtained during the period t6. For this reason, satisfactory reproduced signals can be obtained from all the tracks.

In this way, in this embodiment, since the tracking error signal is shifted to make the head 3 trace track HB2, the number of errors in the reproduced signal from track HB2 can be reduced.

As described above, in each embodiment of the present invention, upon reproducing image signals recorded in the SD and SDL modes having different recorded information sizes per unit time from a tape, since the tracking error signal extraction timing (pilot signal extraction timing) is switched in accordance with the recording mode of the reproduced image signal, image signals recorded in the SD and SDL mode can be satisfactorily reproduced by a common head arrangement.

In the VTR shown in FIG. 4 or 8, some or all process that pertain to the tracking control may be implemented by software using a microcomputer and memory. In this case, the memory stores a program for implementing the aforementioned tracking control.

As this storage medium, a semiconductor memory such as a ROM, RAM, or the like, optical disk, magnetooptical disk, magnetic recording medium, and the like may be used, and they may form a CD-ROM, floppy disk, magnetic card, magnetic tape, nonvolatile memory card, and the like.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for reproducing information signals recorded in a plurality of recording modes each having different amounts of information of information signals to be recorded per unit time, comprising:

reproduction means for reproducing information signals recorded in the plurality of modes from a recording medium;

mode discrimination means for discriminating a recording mode of the information signal reproduced by said reproduction means;

tracking means for controlling tracking between the recording medium and said reproduction means; and control means for controlling a tracking control procedure by said tracking means in different manners in accordance with a discrimination result of said mode discrimination means.

2. An apparatus according to claim 1, further comprising:
expansion means for expanding the amount of information of the reproduced information signal in accordance with the discrimination result of said mode discrimination means.

3. An apparatus according to claim 1, wherein said reproduction means comprises first and second heads for tracing a large number of tracks formed on the recording medium, and reproduces the information signals recorded in the plurality of recording modes using both said first and second heads.

4. An apparatus according to claim 3, wherein the plurality of recording modes have first and second recording modes, and said first and second heads are for the first recording mode.

5. An apparatus according to claim 1, wherein said tracking means comprises tracking error signal generation means for generating a tracking error signal using the reproduced information signal, and convey means for conveying the recording medium in accordance with the tracking error signal, and said control means controls a generation timing of the tracking error signal in accordance with the discrimination result of said mode discrimination means.

6. An apparatus according to claim 5, wherein said reproduction means comprises a rotary head for tracing the recording medium, and said control means controls the generation timing of the tracking error signal in synchronism with a rotation period of said rotary head.

7. An apparatus according to claim 1, wherein said mode discrimination means discriminates the recording mode in accordance with mode identification information reproduced from the recording medium by said reproduction means.

8. An apparatus for reproducing information signals recorded in a plurality of recording modes which compress the amount of information of information signals to be recorded at different compression ratios, comprising:

reproduction means for reproducing information signals recorded in the plurality of modes from a recording medium;

mode discrimination means for discriminating a recording mode of the information signal reproduced by said reproduction means;

tracking means for controlling tracking between the recording medium and said reproduction means; and control means for controlling a tracking control by said tracking means in different manners in accordance with a discrimination result of said mode discrimination means.

9. An apparatus according to claim 8, further comprising:
expansion means for expanding the amount of information of the reproduced information signal in accordance with the discrimination result of said mode discrimination means.

10. An apparatus according to claim 8, wherein said reproduction means comprises first and second heads for tracing a large number of tracks formed on the recording medium, and reproduces the information signals recorded in the plurality of recording modes using both said first and second heads.

11. An apparatus according to claim 10, wherein the plurality of recording modes have first and second recording modes, and said first and second heads are for the first recording mode.

12. An apparatus according to claim 8, wherein said tracking means comprises tracking error signal generation means for generating a tracking error signal using the reproduced information signal, and convey means for conveying the recording medium in accordance with the tracking error signal, and said control means controls a generation timing of the tracking error signal in accordance with the discrimination result of said mode discrimination means.

13. An apparatus according to claim 12, wherein said reproduction means comprises a rotary head for tracing the recording medium, and said control means controls the generation timing of the tracking error signal in synchronism with a rotation period of said rotary head.

14. An apparatus according to claim 8, wherein said mode discrimination means discriminates the recording mode in accordance with mode identification information reproduced from the recording medium by said reproduction means.

15. An apparatus for reproducing image signals from a recording medium on which a large number of tracks are formed, and image signals are recorded in a first recording mode which records an image signal for one frame on n tracks, and a second recording mode which records an image signal for one frame on m (m>n) tracks, comprising:

reproduction means for reproducing the image signals by tracing the recording medium using a plurality of heads;

mode discrimination means for discriminating a recording mode of the image signal reproduced by said reproduction means;

tracking means for controlling tracking between the recording medium and said reproduction means; and control means for controlling a tracking control procedure by said tracking means in different manners in accordance with a discrimination result of said mode discrimination means.

16. An apparatus according to claim 15, wherein said plurality of heads include first and second heads, and said reproduction means reproduces the information signals recorded in the first and second recording modes using both said first and second heads.

17. An apparatus according to claim 16, wherein said first and second heads are for the first recording mode.

18. An apparatus according to claim 15, wherein said tracking control means comprises tracking error signal generation means for generating a tracking error signal using the reproduced information signal, and convey means for conveying the recording medium in accordance with the tracking error signal, and said control means controls a generation timing of the tracking error signal in accordance with the discrimination result of said mode discrimination means.

19. An apparatus according to claim 18, wherein said control means controls the generation timing of the tracking error signal in synchronism with a switching pulse for switching reproduction timings of said plurality of heads.

20. An apparatus according to claim 15, wherein said mode discrimination means discriminates the recording mode in accordance with mode identification information reproduced from the recording medium by said reproduction means.

21. An apparatus according to claim 15, wherein said tracking means controls a relative position between a predetermined one of said plurality of heads and a predetermined target track of the large number of tracks.

22. An apparatus according to claim 21, wherein said tracking means comprises extraction means for extracting a plurality of pilot signals from image signals reproduced from two neighboring tracks of the target track, generation means for generating a tracking error signal on the basis of the plurality of pilot signal components, and convey means for conveying the recording medium on the basis of the tracking error signal, and said control means changes balance between levels of the plurality of pilot signals on the basis of the discrimination result of said mode discrimination means.

23. An apparatus for reproducing image signals from a tape-like recording medium on which image signals are recorded in a first recording mode which compresses an information size of an image signal at a first compression ratio and records an image signal for one frame on n tracks, and a second recording mode which compresses an information size of an image signal at a second compression ratio different from the first compression ratio and records an image signal for one frame on 2n tracks, comprising:

reproduction means for reproducing the image signals by tracing the recording medium using first and second heads having different azimuth angles;

discrimination means for discriminating a recording mode of the image signal reproduced by said reproduction means;

expansion means for expanding the information size of the reproduced image signal on the basis of a discrimination result of said discrimination means;

generation means for extracting a pilot signal from the reproduced image signal, and generating a tracking error signal on the basis of the pilot signal;

convey means for conveying the tape-like recording medium on the basis of the tracking error signal; and control means for controlling a generation timing of the tracking error signal by said generation means in accordance with the discrimination result of said discrimination means.

24. A method of controlling an apparatus for reproducing information signals recorded in a plurality of recording modes each having different amounts of information of information signals to be recorded per unit time, comprising:

a reproduction step of reproducing information signals recorded in the plurality of modes from a recording medium using reproduction means;

a mode discrimination step of discriminating a recording mode of the information signal reproduced in the reproduction step;

a tracking step of controlling tracking between the recording medium and the reproduction means; and a control step of controlling a tracking control procedure in the tracking step in different manners in accordance with a discrimination result in the mode discrimination step.

25. A method of controlling an apparatus for reproducing information signals recorded in a plurality of recording modes which compress different amounts of information of information signals to be recorded at different compression ratios, comprising:

a reproduction step of reproducing information signals recorded in the plurality of modes from a recording medium using reproduction means;

a mode discrimination step of discriminating a recording mode of the information signal reproduced in the reproduction step;

a tracking step of controlling tracking between the recording medium and the reproduction means; and a control step of controlling a tracking control procedure in the tracking step in different manners in accordance with a discrimination result in the mode discrimination step.

26. A method of controlling an apparatus for reproducing image signals from a recording medium on which a large number of tracks are formed, and image signals are recorded in a first recording mode which records an image signal for one frame on n tracks, and a second recording mode which records an image signal for one frame on m (m>n) tracks, comprising:

a reproduction step of reproducing the image signals by tracing the recording medium using a plurality of heads;

a mode discrimination step of discriminating a recording mode of the image signal reproduced in the reproduction step;

a tracking step of controlling tracking between the recording medium and said plurality of heads; and a control step of controlling a tracking control procedure in the tracking step in different manners in accordance with a discrimination result in the mode discrimination step.

* * * * *

UNITED STATES PATENT AND TRADEMARK OFFICE
CERTIFICATE OF CORRECTION

PATENT NO.  : 6,263,148 B1
DATED       : July 17, 2001
INVENTOR(S) : Taizou Hori et al.

It is certified that error appears in the above-identified patent and that said Letters Patent is hereby corrected as shown below:

Drawings,
Sheet S8, Fig. 9, "(SWITCH 28)" should read -- (SWITCH 27) --.

Column 1,
Line 22, "has" should read -- have --; and
Line 25, "such a" should read -- such as --.

Column 2,
Line 3, "f1has" should read -- f1 has --;
Line 4, "f2and" should read -- f2 and --;
Line 5, "f2has" should read -- f2 has --; and
Line 6, "f1and" should read -- f1 and --.

Column 6,
Line 12, "tracks," should read -- track, --.

Column 7,
Line 35, "only" should read -- and only --.

Column 8,
Line 55, "FIG." should read -- FIG. 9 --.

Column 9,
Line 11, "process" should read -- processes --.

Signed and Sealed this

Twelfth Day of March, 2002

Attest:

*Attesting Officer*

JAMES E. ROGAN
*Director of the United States Patent and Trademark Office*